Oct. 9, 1934.  T. R. WATTS  1,976,531
TEST METER
Filed Oct. 30, 1930
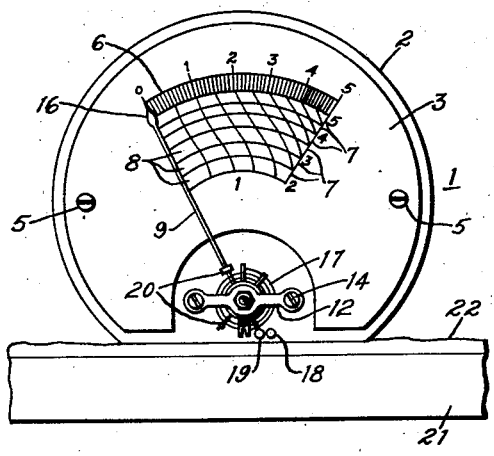
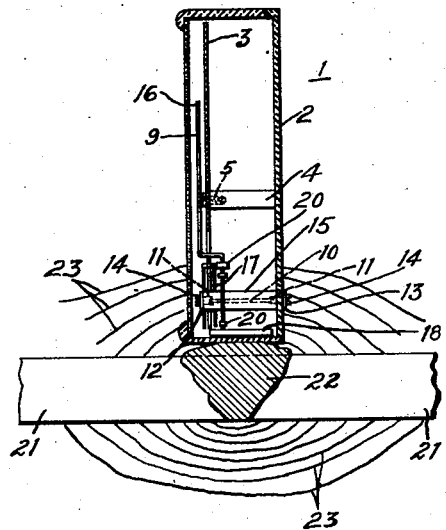
WITNESSES
R. S. Williams
C. W. Shaw.
INVENTOR
Thomas R. Watts
BY
ATTORNEY Patented Oct. 9, 1934

1,976,531

UNITED STATES PATENT OFFICE 1,976,531

TEST METER

Thomas R. Watts, Wilkinsburg, Pa., assignor to Westinghouse Electric & Manufacturing Company, a corporation of Pennsylvania Application October 30, 1930, Serial No. 492,239

2 Claims. (Cl. 175—183)

My invention relates to meters and has special relation to meters designed for testing the quality of welds.

With the rapidly increasing application of welding, especially electric welding by the metallic-arc process, the need for an efficient method and apparatus for testing the completed welds is obvious.

According to my invention, a magnetic flux is passed through the welded structure, perpendicular to the welded seam, by any convenient method. The flux may be obtained from a horseshoe magnet (either an electromagnet or a permanent magnet), bridged across the weld, or by passing the current through an electrical conductor wound around the welded member. The magnetic flux passes through the welded member in a direction substantially perpendicular to the welded seam. Because of the lower permeability of the weld metal, the leakage flux is increased at, and arches over, the weld. Faults in the weld further decrease its permeability and increase the strength of the leakage flux, thereby causing a higher arching of the flux lines immediately over the welded seam. By placing an instrument, designed according to my invention, over the welded seam, the strength of the leakage flux is measured, and the quality of the weld is determined thereby.

An object of my invention is to provide a meter of the above mentioned character which will quickly and efficiently test the quality of the weld by measuring the leakage flux surrounding a weld when a magnetic flux is being passed through the welded member.

Another object of my invention is to provide a meter, as described above, which shall be adapted to measure the density and direction of the leakage flux surrounding the weld.

Another object of my invention is to provide a method of testing a weld which consists in passing a magnetic flux through a welded structure perpendicular to the welded seam and measuring the leakage flux about the weld.

These and other objects may be better understood by referring to the following detailed description, taken in conjunction with the accompanying drawing, in which:

Figure 1 is a view, in front elevation, of an instrument constructed in accordance with my invention, the glass cover thereof being removed.

Fig. 2 is a view, in side elevation, partly in section, of the instrument shown in Fig. 1.

Referring to the drawing, a meter 1 is provided with a suitable non-magnetic enclosure or casing 2. A dial 3 is secured to a pair of supporting members 4, which are integral with the casing 2, in any well known manner, as by screws 5. The scale 6, having the usual numerals and graduations, is painted or marked on the face of the dial 3. A plurality of auxiliary scales 7 are marked on the dial face concentric with, and underneath, the scale 6. A plurality of graduations 8 are marked on the scales 7 to correspond to the graduations of the scale 6.

An indicator member 9 is mounted on a shaft 10, which is rotatably supported in bearings 11, preferably of the jewel type. The bearings 11 are supported by cross members 12 and 13 which are secured, by means of screws 14, to a pair of parallel supports 15 integral with the casing 2. The indicator member 9 is provided with a pointer tip 16 which is adapted to cooperate with the scale 6, and the shaft 10 is restrained by a coiled hair-spring 17 which tends to return the pointer 9 to its zero position.

A bar 18 of non-residual magnetic steel is mounted near the bottom of the casing 2, and a similar bar 19 is fixed to a portion of the pointer 9 which extends below the shaft 10. When the pointer 9 occupies its zero position with respect to the scale 6, the bar 19 will occupy a position parallel to, and a very slight distance from, the bar 18. The movable element 19 may be counterbalanced by suitable weights 20.

The meter 1 is shown in its operative relation with respect to a welded structure, the parent metal of which is designated at 21 and the welded seam at 22. Lines 23 indicate the path of a leakage flux of a magnetic circuit passed through the parent metal 21 and the weld metal 22, for a purpose to be hereinafter more fully explained.

The operation of my device is as follows:

A magnetic flux is passed through the welded structure, as explained above, in any well known manner.

The magnetic flux passes through a steel plate 21 and the weld 22 in a direction substantially perpendicular to the welded seam. Because of the lower permeability of the weld member 22, the leakage flux 23 is increased at the weld and arches over it. Faults in the weld decrease its permeability still further, and increase the strength of the leakage flux immediately over it, thus causing a higher arching of the flux line 23. If the welded seam is of varying quality, the flux will tend to be by-passed around the faults and through the better portions of the weld. Thus, the flux in the parent metal 21 is less than normal adjacent to a fault in the weld, and causes a corresponding decrease in the leakage flux over the adjacent parent metal. Therefore, an instrument capable of indicating the density and direction of the leakage flux in the vicinity of the weld indicates the quality of workmanship in the weld.

To make a test the instrument 1 is placed adjacent to the welded seam in such manner that the magnetic bars 18 and 19 are parallel to the path of the magnetic flux. When the bars 18 and 19 are brought into a magnetic field, they will be similarly magnetized, and the repulsion between their like poles will cause a deflection of the pointer 9 over the scale 6; the deflection being a function of the flux density induced in the bars 18 and 19. In any given magnetic field, the deflection will be greater when the bars 18 and 19 are parallel to the lines of flux, and zero when the bars are perpendicular to the lines of flux. Thus, by simply moving the meter, it is possible to determine the direction and magnitude of the leakage flux around the bars 18 and 19 and, by calibration, to interpret the reading in terms of quality of weld.

The scale 6 is disposed to facilitate the determination of the ratio of the weld reading to that of the adjacent plate, as a number of scales are provided having various numbers of divisions equal to full scale deflection.

At any usual flux density, the deflection will be such that it reads unity, or one, on some scale provided. The observer will then disregard all the other scales and will take the weld reading on the scale selected which gives the ratio of that reading to the former reading.

A wide variety of special scales may be devised to fit any given requirement for a given material and type of weld. The scale may be made to indicate directly the approximate efficiency of a welded joint but, in general, a more versatile scale would be used, with calibration curves for different materials and types of welds.

I do not wish to be restricted to the specific arrangements of parts herein set forth as it is evident that various modifications thereof may be made within the spirit and scope of my invention. I desire therefore, that only such limitations be imposed as are indicated in the appended claims.

I claim as my invention:

1. In a meter for testing the homogeneity of a piece of magnetizable material, a movable indicator member, a bar of non-residual magnetic material secured to one end of said indicator member, a casing of non-magnetic material having a peripheral wall, one portion of which is curved and another portion of which is flat, means for pivotally supporting said indicator member in such a position within said casing that said bar is adjacent the flat peripheral wall, and a second bar of non-residual magnetic material mounted stationarily in the casing adjacent the flat peripheral wall and parallel and adjacent to said first bar when the indicator is in its zero position.

2. A weld-testing instrument comprising a dial, a plurality of scales marked upon said dial corresponding to different magnetic material to be tested, a pointer adapted to cooperate with said scale, a non-residual magnetic member carried by said pointer, and a fixed non-residual magnetic member juxta-posed to said first named magnetic member in the de-energized position.

THOMAS R. WATTS.